April 1, 1941.  A. W. LISSAUER  2,236,800
METHOD OF TREATING DISTILLERY WASTES
Filed Sept. 27, 1937
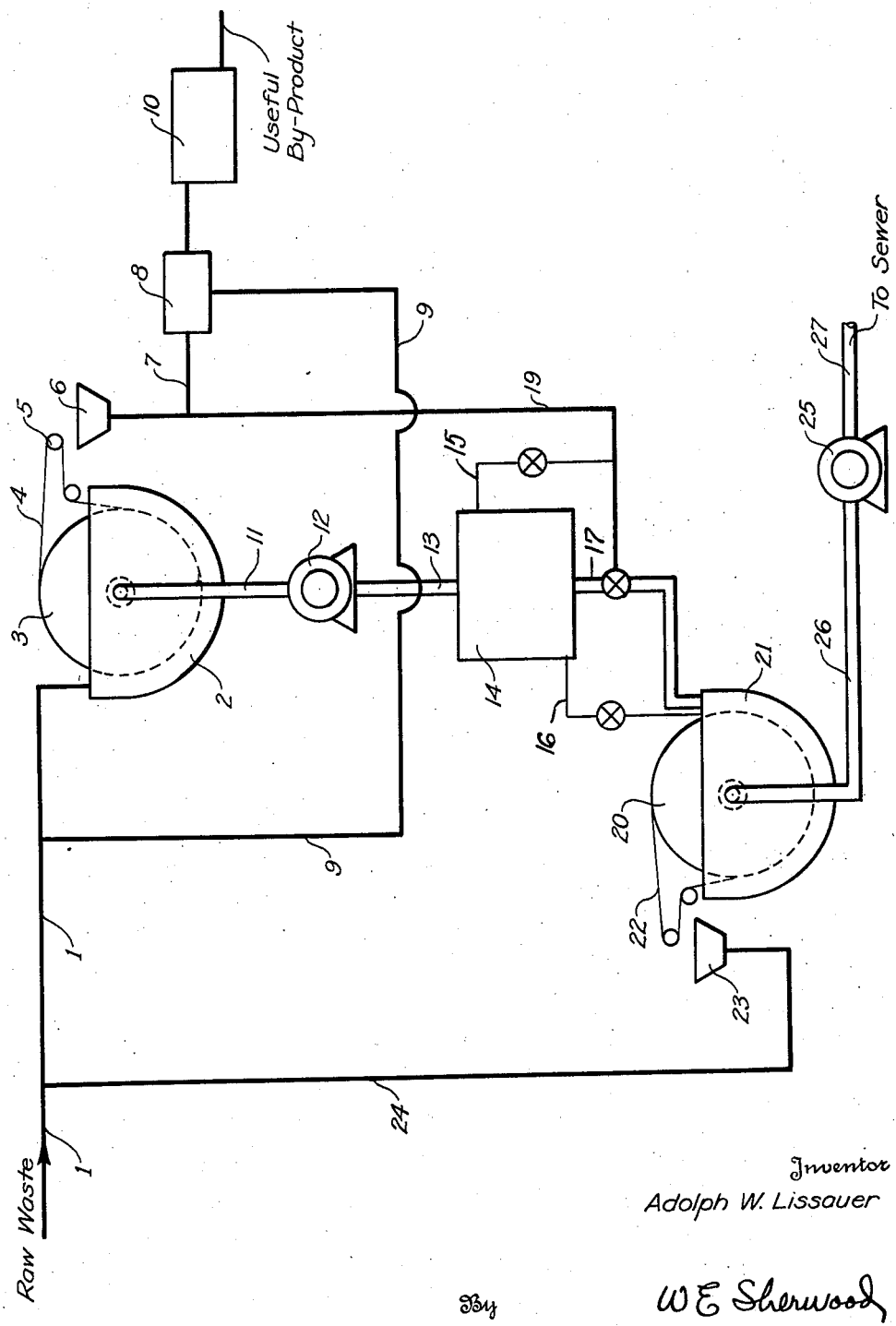
Inventor
Adolph W. Lissauer
By W. E. Sherwood
Attorney Patented Apr. 1, 1941

2,236,800

UNITED STATES PATENT OFFICE 2,236,800

METHOD OF TREATING DISTILLERY WASTES

Adolph W. Lissauer, Louisville, Ky., assignor to Louisville Drying Machinery Company, Louisville, Ky., a corporation of Kentucky Application September 27, 1937, Serial No. 165,871

3 Claims. (Cl. 210—199)

This invention relates to a new and improved method of treating industrial wastes, as for example the waste from distilleries, breweries, packing houses, canneries and the like. In treating such materials the dual problem of recovering a maximum amount of useful by-products therefrom and at the same time reducing the deleterious effects of the residual materials in the waste liquids is customarily involved. In the treatment of distillery waste, which will be taken as an example of one utilization of the present invention, it is particularly important that the residual materials found in the waste liquid be of such nature or amount that subsequent putrefaction of the same with a resultant high B. O. D. on the disposal system to which they are directed cannot develop to any appreciable extent.

In order to achieve this result numerous processes of handling and treating wastes of this character have been developed. For the purpose of avoiding the high costs of evaporative systems for such wastes, various methods of filtering and pressing the raw wastes and treating the residual liquids by chemical, bacteriological, electrical and other precipitation means have been employed. Up to the present time, however, it has been impossible to lower the B. O. D. of distillery waste liquors to a point satisfactory to the health authorities without employing means which are excessive in cost or inefficient in operation. While such known precipitation processes offer potential advantages in treating of such wastes it appears that their utility has been impaired due to the excessive amount of solids, particularly of suspended nature, which are contained within the liquid under treatment.

The present invention therefore has as one object the teaching of a process of treating wastes wherein the precipitation load on the process is reduced to a value which can be readily handled by known precipitation means.

A second object is the teaching of an improved method of treating wastes whereby a greater amount of suspended solids may be removed from the waste liquids prior to a precipitation step.

Another object is the teaching of an improved process whereby a greater amount of useful by-products may be recovered from a waste material.

A further object is the teaching of a more rapid and less expensive process for the purification of the residues of industrial wastes after the removal of useful by-products.

A further object is the teaching of a circulating refiltering method in the purification of liquid pressed from wet materials. A further object is the teaching of an improved process for the drying of a precipitated sludge without requiring filter presses, separate driers or lowering of the efficiency of the main drier.

Other objects and advantages of the invention will become more apparent as the description proceeds.

As shown in the accompanying diagrammatic drawing a raw waste, which in the treatment of distillery waste would be a thick slop containing grains in suspension and in solution, enters the process through pipe 1. This thick slop is conducted to a tank 2 containing a bath of liquid and solid materials in which a rotary vacuum filter means 3 is constantly revolving. This filter means may be of any conventional nature and of a type which will serve to separate the solid grain materials from the liquid in an efficient manner.

The damp grain solids thus separated by the vacuum filter are conveyed by moving filaments 4 over a discharge roll 5 whence they are deposited in hopper 6. In general, the major portion of the solids thus separated are the heavier and larger grain particles plus a certain proportion of finer particles mechanically entrapped with the larger particles.

It has been found that the mixing of light particles, as for example the sludge of extremely fine precipitated particles, with these heavier, larger solids as a binder results in a simple and practicable method of removing such particles from the waste. When such small particles are separately recovered it usually is necessary to employ filter presses or the like since the usual roller press permits too large a portion of the same to filter out with the liquid. By the sequence of steps herein taught, however, it becomes possible to recover these small particles without the necessity of using such auxiliary apparatus.

From hopper 6 the major portion of the solids are then moved to a press 8 which may be of the conventional roller type through a pipe or conveyor 7 by any suitably controlled means, not shown. In passing through press 8 an appreciable amount of liquid is expressed from the damp solids and during such pressing an appreciable amount of finer solids pass with the expressed liquid into pipe 9. However, at the same time, a large amount of finer solids are pressed into the larger solids and remain therewith. The pressed solids with their lowered moisture-content are then delivered to a drying means 10 from which the dried product is removed to form the useful by-product of the waste material. In the case of distillery slop treatment this by-product may take the form of dried grain particles having a high protein content and being useful as a feed product. Since the drying load, the cost of drying and the size of drier are dependent upon the moisture-content of the material to be dried the advantage in using a press 8 to lower such moisture-content is obvious.

Moreover the advantage in having the pressed solids pass directly into the drier 10 without admixture with a high moisture-content mass of precipitated sludge reclaimed from waste liquids as heretofore practiced is likewise apparent. When such sludge with its high moisture-content is so mixed with the pressed solids in order to effect recovery of the sludge a heavy drying load is then thrown upon the drying apparatus. In the present invention no additional drying load and no loss of such precipitated sludge is present due to the arrangement whereby such sludge is mixed with the thick slop entering through pipe 1.

However, in using such a press the small solids pressed out with the liquid are left over for further treatment. In the processes disclosed in the Lissauer and Coffey U. S. Patents 2,070,285 and 2,070,286, the effluent from the pressing step is moved directly into the subsequent precipitation step and as a consequence a heavy precipitation load is developed therein due to the presence of these pressed out solids. As a result of the presence of the large amount of small solids in suspension with the waste liquids the precipitation means whether chemical, bacteriological, electrical or other type, is called upon to handle such a load of putrefiable material of potentially high B. O. D. characteristics that the cost and time involved for the completion of the precipitation process has on occasion with certain waste products been commercially impracticable.

The present invention teaches a method of avoiding this undesirable condition and as a consequence provides a remarkably more efficient process in the treatment of waste materials.

As indicated generally in the drawing the liquid with the accompanying pressed out small solids is conducted from press 8 through pipe 9 back to the inlet pipe 1 where it mixes with the thick slop and is available to recirculate through the vacuum filter stage. In this way a continually recirculating and refiltering of liquid having pressed out solids in suspension may be provided. For convenience, this liquid is hereinafter termed "heavy liquid" in order to distinguish the same from the liquids containing small, light solid particles.

By virtue of the inherent characteristics of vacuum filtering apparatus the filter 3 when revolving in bath 2 serves to collect a cake of solid material on its filtering surface. The maintenance of a small vacuum within the filter is insufficient to pull large solids through its efficient filtering surface and results in a constant drainage of liquid together with very small suspended solid particles into the outlet pipe 11. For convenience this liquid containing very small, light grain particles in suspension plus the soluble grain elements is hereinafter called "light liquid."

It will be noted that the "light liquid" passing through pipe 11 comprises the entire residual liquid of the slop or other waste. Since the "heavy liquid" derived from press 8 is being recirculated rather than being mixed with the "light liquid," as taught in the abovementioned patents, it follows that the precipitation load in the subsequent precipitation stage is appreciably lowered with a consequent reduction in cost, and in time of completion and with a corresponding increase in efficiency of the process. Moreover, since the degree of suction exerted by the vacuum filter 3 can be readily varied by means of conventional controls (not shown) applied to vacuum pump 12 it is possible to reduce the amount of solids in the light filtrate to a very low value merely by reducing the degree of suction employed by the filter 3.

Any conventional type of vacuum pump 12 may be used to pull this "light liquid" from filter 3 and to direct it to a precipitation apparatus 14 through the pipe 13. After the desired precipitation of the suspended solids has taken place in the precipitation apparatus 14, the clarified liquid or effluent may be drawn off through pipe 15 and directed, in some suitable way, to pipe 27 leading to the sewer while the precipitated sludge may be separately conducted through pipe 16 to the vacuum filter 20. If desired, both effluent and sludge may be passed through pipe 17 to the filter 20.

In order to insure an adequate blanket of solids for the vacuum filter 20, a portion of the first filtered solids may be led from hopper 6 into tank 21 by means of a pipe or conveyor 19. These solids together with the precipitated sludge resulting from the precipitation stage are removed by the moving filaments 22 and are then transported from hopper 23 back into the inlet pipe 1 through a pipe or conveyor means 24.

By thus returning the light solids recaptured from the precipitated sludge to be mixed with the thick slop, the necessity of using separate filter presses is obviated, the entire amount of recaptured solids is brought back into the system and the moisture-content of solids going to drier 10 is not increased as would be the case if such precipitated solids with their high moisture-content were mixed with the pressed solids entering the drier.

In order to remove the clear liquid from the final filtering step a vacuum pump 25 is provided and draws the clarified liquid through pipe 26 and delivers it to a place of disposal through pipe 27.

As a result of this sequence of steps substantially all of the solids contained in the waste are recovered and utilized as a valuable by-product and at the same time due to this sequence of steps, and particularly to the arrangement whereby a reduced amount of suspended solids passes into the precipitation stage 14, the known methods of precipitating solids from waste liquids and of clarifying such liquids may now be utilized commercially with less expense and with greater rapidity of clarification.

It has been found that by following the teachings of the present invention, the B. O. D. of the treated effluent from Bourbon distillery slop can readily be reduced to values commensurate with the health requirements and at the same time the cost and time of precipitation treatment has been materially reduced. Similar advantages would likewise be realized in the treatment of analogous wastes such as those from breweries, canneries, packing houses and the like.

Having thus described my invention, I claim:

1. A method of treating thick distillery slop comprising: filtering the thick slop to separate its coarse solids and cloudy light liquid constituents; treating the cloudy light liquid with a precipitating agent to form and separate a wet sludge and a clarified waste liquid of lowered B. O. D.; filtering the wet sludge to separate its wet solids and waste liquid constituents; and returning the wet solids to the thick slop.

2. A method of treating thick distillery slop comprising: filtering the thick slop to separate its coarse solids and cloudy light liquid constituents; pressing the coarse solids to separate its damp cake and cloudy heavy liquid constituents; returning the heavy liquid to the thick slop; treating the cloudy light liquid with a precipitating agent to form and separate a wet sludge and a clarified waste liquid of lowered B. O. D.; filtering the wet sludge to separate its wet solids and waste liquid constituents; and returning the wet solids to the thick slop.

3. A method of treating thick distillery slop comprising: filtering the thick slop to separate its coarse solids and cloudy light liquid constituents; treating the cloudy light liquid with a precipitating agent to form and separate a wet sludge and a clarified waste liquid of lowered B. O. D.; mixing a portion of the coarse solids with the wet sludge; filtering the mixture to separate its wet solids and clarified waste liquid constituents; returning the wet solids to the thick slop; pressing the coarse solids to separate its damp cake and cloudy heavy liquid constituents; and returning the heavy liquid to the thick slop.

ADOLPH W. LISSAUER.